United States Patent [19]
Jacobs et al.

[11] Patent Number: 5,059,958
[45] Date of Patent: Oct. 22, 1991

[54] MANUALLY HELD TILT SENSITIVE NON-JOYSTICK CONTROL BOX

[76] Inventors: Jordan S. Jacobs; Marvin Jacobs, both of 38 Sunrise Ave., Ormond Beach, Fla. 32176

[21] Appl. No.: 507,249
[22] Filed: Apr. 10, 1990
[51] Int. Cl.$^5$ ............................................. G09G 3/02
[52] U.S. Cl. .................................... 340/706; 340/709; 273/148 B; 200/61.47; 200/61.52
[58] Field of Search .................. 200/61.47, 61.52; 340/706, 709; 273/148 B, 1 G; 379/96

[56] References Cited

U.S. PATENT DOCUMENTS

| | | | |
|---|---|---|---|
| 3,809,395 | 5/1974 | Allison, Jr. et al. | 340/709 |
| 4,425,488 | 1/1984 | Moskin et al. | 200/61.47 |
| 4,445,011 | 4/1984 | Hansen | 200/6 A |
| 4,542,903 | 9/1985 | Yokoi et al. | 273/1 G |
| 4,567,479 | 1/1986 | Boyd . | |
| 4,687,200 | 8/1987 | Shirai | 273/148 B |
| 4,739,128 | 4/1988 | Grisham | 379/96 |
| 4,817,950 | 4/1989 | Goo | 273/148 B |
| 4,925,189 | 3/1990 | Boaening | 273/148 B |
| 4,969,647 | 11/1990 | Mical et al. | 273/1 G |

OTHER PUBLICATIONS

Fisher et al., "Virtual Environment Display System" 10-1986.

*Primary Examiner*—Alvin E. Oberley
*Assistant Examiner*—R. Liang

[57] ABSTRACT

A control device having a boxlike shaped enclosure that is held with both hands for tiling to produce corresponding tilt attitude control signals while the fingers of both hands are used to actuate switches symmetrically disposed on the top section of the enclosure to produce auxiliary control signals. The device is a non-joystick control box that provides easy reference to neutral and equally accommodates both left and right handed persons for rapid control of computers, video games, toys, vehicles, models, and machinery to which it is interfaced. The enclosuure can be contoured to represent the shape of the object being controlled.

15 Claims, 4 Drawing Sheets

MANUALLY HELD TILT SENSITIVE NON-JOYSTICK CONTROL BOX

SUMMARY OF THE INVENTION

The invention is a non-joystick, manually held, box-like structured device that encloses a plurality of position responsive gravity switches for providing electrical control signals to computers, video game systems, toys, and machinery. Signal coupling between the control box and the system being controlled is accomplished by a multi-conductor cable and/or other interfacing circuitry techniques. Different functional and directional signals are generated by maintaining different tilt angles of this non-joystick controller. The flat plane box shape of this controller facilitates detection and maintenance by the operator of a horizontal neutral control position. The operator easily actuates auxiliary control switches mounted on the external surfaces of the box, while holding the box in desired tilt attitude control positions. When the box is placed on a table or any horizontal or inclined surface, it maintains a corresponding neutral or other desired control position. The rectangular box can be shaped or contoured to represent a vehicle or any other object being controlled.

BACKGROUND OF THE INVENTION

This invention relates to manually operable, multi-functional or multi-directional control devices such as joystick controls or equivalent for controlling variables in electrical apparatus such as computers, video games, toys, and machinery.

"Joysticks" are often used for controlling a variety of electrical systems such as video displays requiring positional or directional control in two dimensions. Most prior art hand controllers include joysticks that utilize pressure switches to produce switching action in response to movements of the joystick handle, such as in U.S. Pat. No. 4,124,787 issued to Aamoth et al. This type of prior art controller is complex, unreliable, mundane, and awkward to use. Attempting to correct the problems inherent in the Aamoth et al type of joystick, Hansen U.S. Pat. No. 4,445,011 proposes a joystick handle containing mercury switches; this technique fails to resolve the wrist fatigue attendant to joystick type controllers, is particularly awkward to use in rearward attitudes, it by itself does not provide a good neutral or control position reference while either hand held or set down, and it does not provide for effective ergonomic placement and utilization of external auxiliary control switches. Also, Moskin et al, U.S. Pat. No. 4,425,488, describes a mercury switch arrangement in a pistol grip controller mounted on a base for avoiding the shortcomings of the Aamoth et al type joystick; however, it also fails for some of the same reasons as in the Hansen patent. In U.S. Pat. No. 3,787,647 issued to Hughes and U.S. Pat. No. 4,201,900 issued to Marchev, fluid-type gravity switches of various configurations are described. None of these configurations are known to have been used for electrically controlling multi-directional variables; these patents do not disclose means for controlling movement or position of images in an X-Y plane on a video display. In U.S. Pat. No. 4,567,479, Boyd discloses a mercury switch controller affixed to the head of an incapacitated user; head movement activates an array of switches for sending signals to a computer console or video device. However, the device is limited for attachment to the user's head; while changing the attitude of the device, the user, on a practicable basis, cannot ergonomically observe the resulting effect, since head movement causes a change in the result.

All of these prior art techniques, due to their configuration or method of application, do not provide optimum interaction between the operator and the system being controlled.

Based on the time span and variety of device implementations covered by all prior art, with none of them concerned with or citing a non-joystick, boxlike shaped controller held with two hands for effectively generating functional and/or directional control signals by tilting the box while actuating switches for auxiliary signals and facilitating a neutral control position reference and maintainance, this invention is conclusively unique in arrangement and application. Therefore, it is definitely not obvious to persons having ordinary skill or experience in the area of technology related to this device.

With respect to all prior art, the invention described herein provides faster reaction time, better operating reliability, lower production cost, enhanced human factors, and is intriguingly unique and novel. This device appears to be more desirable than video controllers currently on the market such as the popular joystick control, joypad control, track-ball control, infrared hand position sensor control, glove control, steering wheel control, and other types of devices primarily used for video and other control applications.

OBJECTS OF THE INVENTION

One object of the invention is to provide an improved and unique multi-directional/multi-functional control device for directing the operation of computers, video games, toys, and machinery.

A second object of the invention is to provide a non-joystick control device in the form of a rectangular box or similar shape.

A third object of the invention is to provide control of other systems by using the tilt attitude of the box to generate corresponding directional or functional control signals by incorporating one or more conductive fluid gravity switches such as mercury switches or using other gravity means for operating switches.

A fourth object of the invention is to provide a simple control box enclosure that is held with two hands for optimizing stable control operation and that affords equally good utilization by right-handed or left-handed persons.

A fifth object of the invention is to provide a lightweight control box constructed with minimum parts to optimize reliability and to reduce manufacturing costs.

A sixth object of the invention is to have a control device that is easy to reference with respect to a neutral or other selected control positions and one that maintains a desired position when placed on a table or any supporting surface. It should be noted that the surface may be horizontal or inclined.

A seventh object of the invention is to provide auxiliary control switches on one or more surfaces of the control box enclosure for manual actuation while holding the box at any desired tilt attitude control position. These auxiliary controls can be internal to the enclosure if walls of the enclosure are soft-sided.

An eighth object of the invention is to have a control box having the sides of the box contoured, to represent a vehicle such as an airplane, automobile, train or boat in order to control a video game, a computer, an operational model or other object related to the contour of the box.

A further object of the invention is to provide for a non-joystick control box using mercury switches having a special bulb design for simple attachment to a supporting member whereby the special design shape provides appropriate switch inclination angles; also, the supporting member for a mercury switch can have a fixed or adjustable angle.

Yet another object of the invention is to incorporate a crescent-shaped or continuous loop-shaped mercury switch having a series of incremental reservoirs wherein each reservoir has two electrodes that are shorted when the ball of the conductive fluid is manipulated into any one of the reservoirs.

The foregoing objects are achieved in a manually held, non-joystick control box that is interfaced by circuitry and connecting cable or remote means such as infrared coupling, to the system being controlled. Tilting the box in any direction provides discrete output signals that signify commands such as directional data; tilting forward, back, right, left, or diagonally generates corresponding control signals. The appropriate signal is generated by employing encapsulated mercury bulb switches or other conductive fluid gravity switches or other switching means that react to the tilt orientation of the control box. The non-joystick control box provides enhanced ergonomics by allowing support of the device using two hands. This in turn facilitates the actuation of auxiliary control switches used to provide other functional signals.

When tilt attitude of the box causes switch contact operation, an electrical signal or ground is provided to the system being controlled. When the box is repositioned, a new signal or signals are generated or none at all, if the box is in its neutral orientation. Other switches for manual actuation can be provided as part of, or separate from, the box in order to provide electrical control signals not dependant upon tilt attitude or orientation of the control box.

An alternate application of the device is accomplished by attaching the control box to the system equipment under control in order to provide the operator with feedback signals or system tilt attitude indications.

It should be noted that more than one array of mercury switches, or the equivalent, can be used on the base platform of the enclosure to provide for redundant, but independent, signal operation in cases where more than one system is to be controlled concurrently. Also, independent control boxes can be used to control the same system in a more complex application or in an amusement or competitive application wherein each control box is handled by a different operator. Furthermore, the top surface of the control box can be marked with graphics depicting a vehicle, such as an aircraft, when the box is used in applications to control a related operational vehicle. Alternatively, the edges of the control box can be contoured to represent the vehicle being controlled in this type of application.

Design of the mercury switch or conductive fluid gravity switch bulb can be contoured to support the switches in a desired position. Alternatively, the shape of the bulb of the mercury switch or equivalent can be designed with a flat surface to be affixed to a flat supporting plane or printed circuit board so the mercury switch or equivalent is secured easily in a desired position.

In special applications where it is desired that the degree of tilt results in increasing or decreasing increments of resistivity, the control box contains a crescent-shaped or partial or completely circular bulb of nonconductive material having a plurality of separated wells each of which contain two electrodes; a ball or globule or mercury or other conductive fluid, when shorting the electrodes in any of the wells, resulting from attitude change of the control box, causes a resistivity change signal to the system being controlled based on the resistor placed in series with the output of the shorted electrodes.

BRIEF DESCRIPTION OF THE DRAWINGS

Other objects and advantages of the present invention relative to all other prior art will become apparent upon reference to the following specification and annexed drawings in which.

DETAILED DESCRIPTION OF THE INVENTION

The description in conjunction with the foregoing figures encompasses various configurations and applications and more specifically discusses preferred embodiments of the invention.

Figure 1:
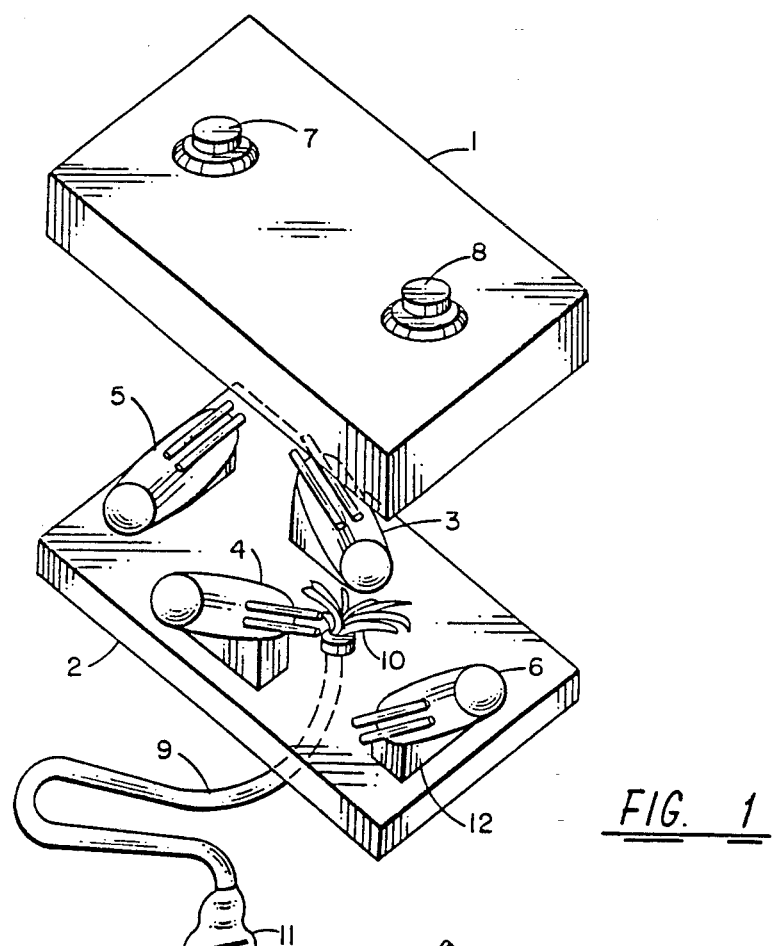
FIG. 1 is an exploded and partially transparent view of the primary preferred embodiment of a tilt sensitive non-joystick control box that is formed to be manually held.

The primary preferred embodiment of the tilt sensitive non-joystick control box is a generally rectangular shaped enclosure as shown in the exploded view, FIG. 1. Complete enclosure of the control box is accomplished by top section cover 1 and bottom section 2 that supports and holds the array of four mercury switches 3, 4, 5, 6 perpendicular to each other and at appropriate inclined attitudes. As shown, the cover section holds two auxiliary control function switches 7, 8 for manual actuation; these switches are electromechanical, preferably "bubble" type that complete electrical circuit paths when the bubble is depressed, facilitating more rapid operation. Top cover 1 and bottom 2 also enclose the inter-switch wiring and/or printed circuit interface board (not shown) and multi-conductor cable wiring 10; in special cases, an interface circuit may be interposed. In the switch array shown, no switch contact closure or output signal is generated when the control box is maintained in a horizontal plane with respect to the earth's surface (or perpendicular to a vertical axis parallel to the earth's gravitational direction). When the control box is tilted forward, rearward, right, or left the corresponding assigned mercury switch electrodes are shorted thus generating a respective output signal to the system being controlled. For example, when the control box is tilted in a direct forward direction (rotating around the left to right horizontal axis), the mercury in switch 5 shorts the electrodes resulting in a signal that could signify forward, up, or north to the system being controlled; tilting the control box diagonally to the right forward corner (rotating around both the left to right and front to back horizontal axes) would cause mercury switches 4 and 5 to have concurrent contact closures resulting in two output signals that could signify forward right diagonal, +45 degrees between two axes, northeast, etc. to the system being controlled. Representations of the tilt signals are dependent on the programming or design of the system being controlled. Each of the mercury switches 3, 4, 5, 6 are held in place by a switch support holder 12.

Figure 2:
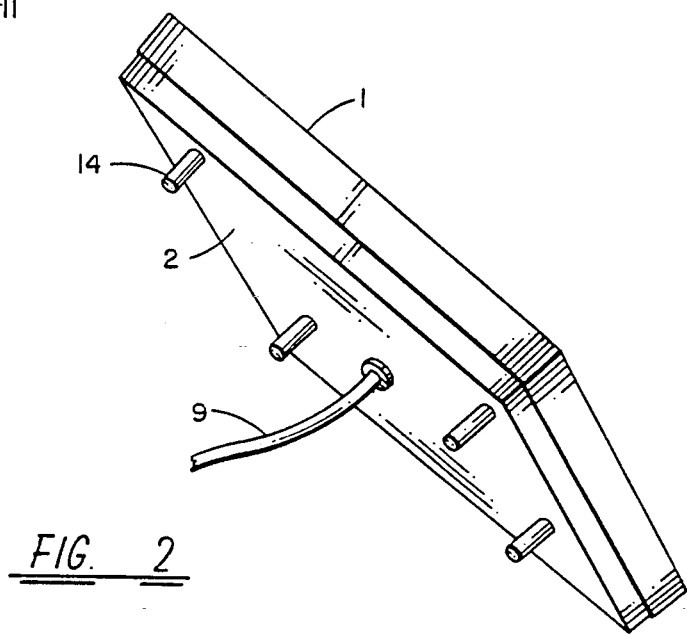
FIG. 2 is a bottom view of the non-joystick control box showing centered cable and optional leg supports.

The interconnecting cable 9 is lightweight and brought out of an aperture in the center of the bottom base 2 of the control box. This is shown in FIG. 2 along with supporting legs 14 attached or as an integral molded part of base 2; this maintains the control box in a neutral or desired inclination without interference from cable 9 when placing the control box on a table.

Figure 3:
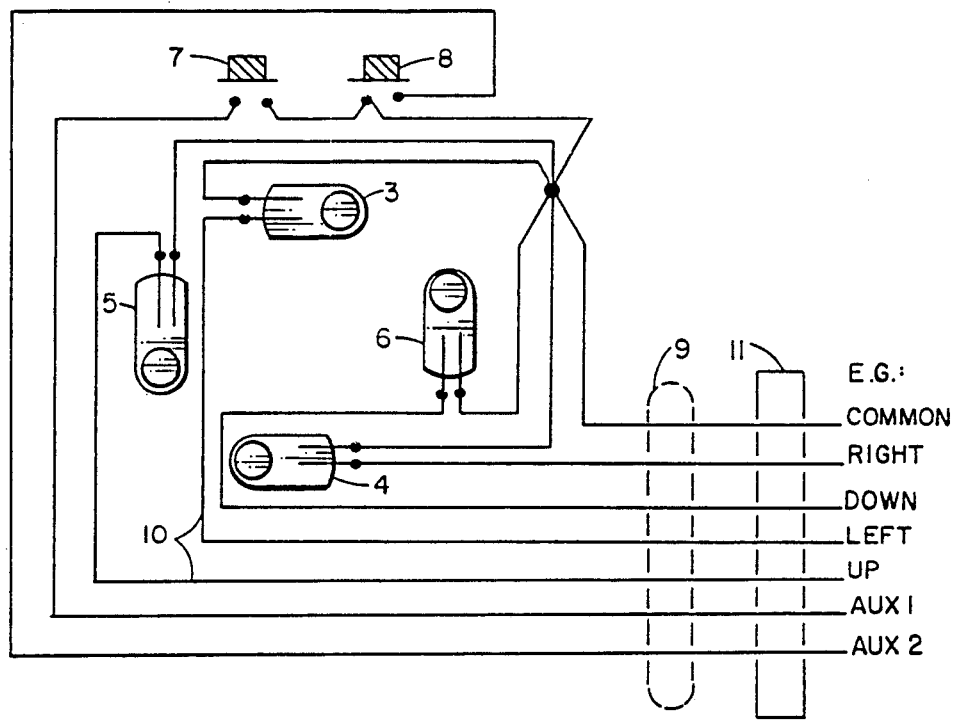
FIG. 3 is a simplified wiring schematic or printed circuit board schematic of the primary preferred embodiment of the invention.

FIG. 3 shows the electrical wiring schematic of the control box having four mercury switches 3, 4, 5, 6 for tilt attitude sensing control and two electromechanical (or "bubble" type) switches 7, 8 for auxiliary function control. One contact or electrode of each switch is interconnected or wired in common to a common tie point and then connected through cable 9 to connector 11. The other contact or electrode of each switch is independently wired to connector 11 through cable 9. An example of assigned control functions for a nominal system application is also shown as: Common, Right, Down, Left, Up, Auxiliary 1, Auxiliary 2.

Figure 4:
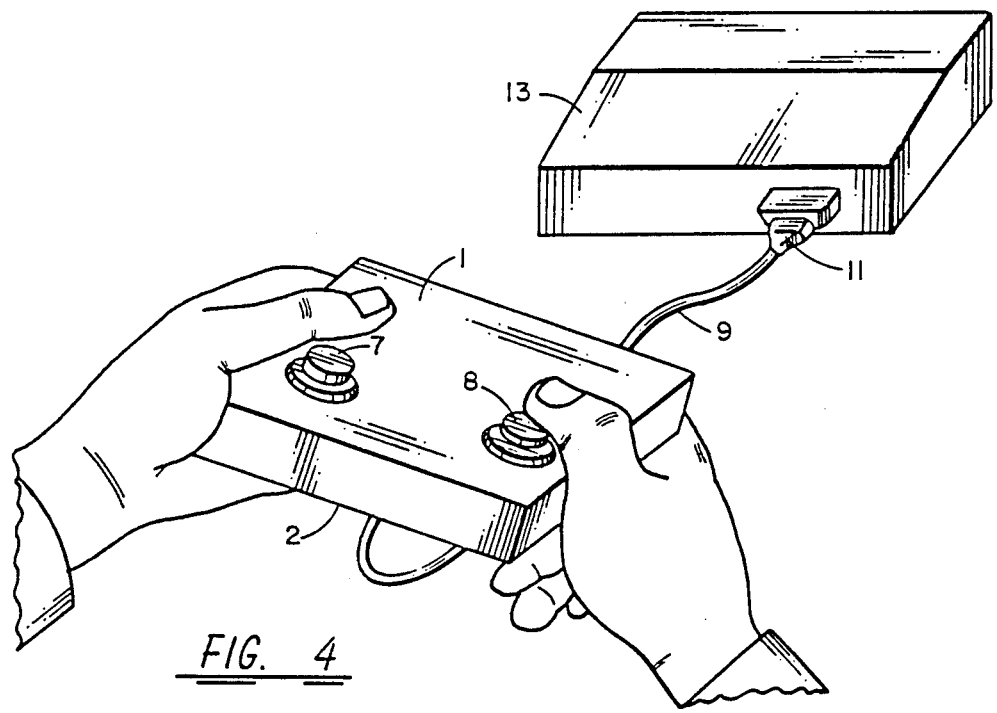
FIG. 4 is a perspective view of the non-joystick control box in its primary application as a hand held controller of other systems.

A perspective view of the tilt attitude sensitive non-joystick control box in its application as a hand held controller of other systems is shown in FIG. 4. The control box top 1 and bottom base 2 is shown outfitted with auxiliary controls 7, 8 and cable 9 with connector 11 for control application to the system 13 being controlled.

Figure 5:
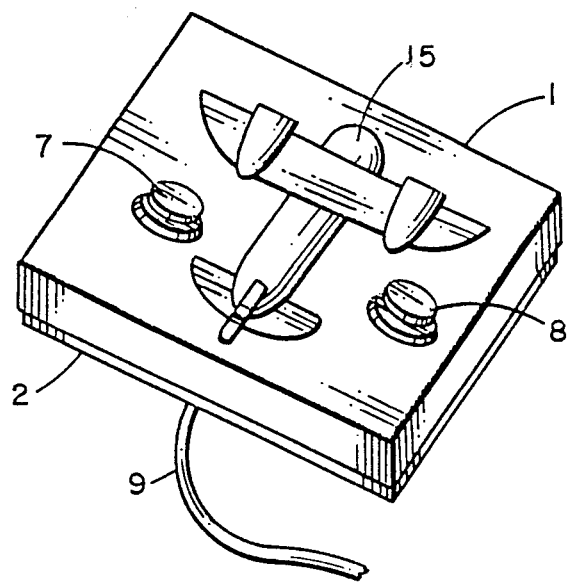
FIG. 5 is a perspective view of the non-joystick control box having markings on its surface depicting and representing a vehicle related to the vehicle system being controlled.

In FIG. 5, the external control box parts 1, 2, 7, 8, 9 previously discussed are shown. The top 1 of the control box, in this case, has the markings 15 of an airplane for an application wherein a computer, video game, or operational vehicle being controlled is related to an airplane. Markings depicting automobiles, ships, etc. would be used in other cases. Markings could be applied to the top cover 1 by means including printing, engraving, embossing, molding, stencil-work, or by decal. Changing the attitude of the control box, for the airplane case shown, would cause the airplane in a video display to maneuver correspondingly or an operational airplane or toy equivalent to travel in accordance with the attitude of the control box.

Figure 6:
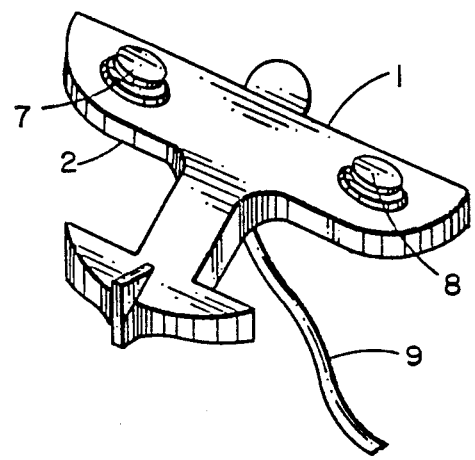
FIG. 6 is a perspective view of a contoured non-joystick control box that has the sides of the box shaped to represent the vehicle system being controlled.

The control box can be contoured in the shape of a vehicle being controlled. An airplane shaped control box is shown in FIG. 6 in which all the external parts 1, 2, 7, 8, 9 are equivalent to the parts of the basic rectangular control box. The sides of the control box are shaped like an aircraft wherein the sides or edges of the top cover 1 and bottom base 2 are contoured. Changing the tilt attitude of this vehicle shaped non-joystick control box causes changes to the vehicle in the system being controlled. It should be noted that the control box can be shaped to represent any object and when the shaped control box tilt attitude is changed, a corresponding assigned or computer programmed change to the object being controlled would occur.

Figure 7:
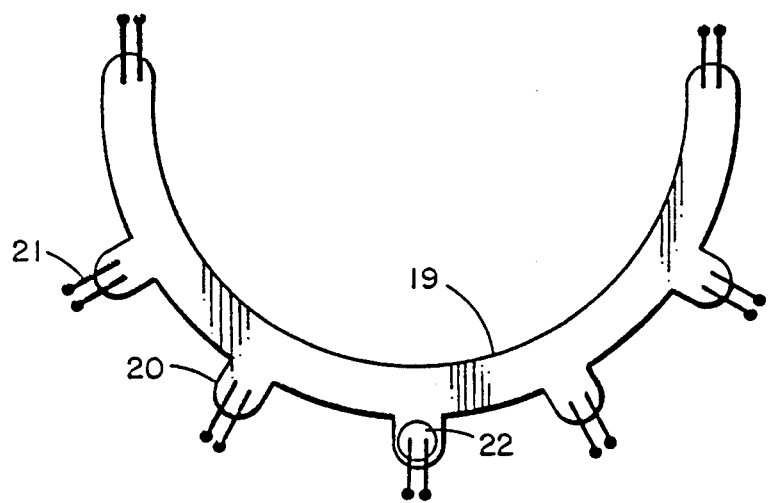
FIG. 7 is a crescent-shaped bulb or otherwise partially or fully circular bulb having spaced reservoirs for capturing a bead of conductive fluid to provide a plurality of control positions based on tilt attitude.
Figure 8:
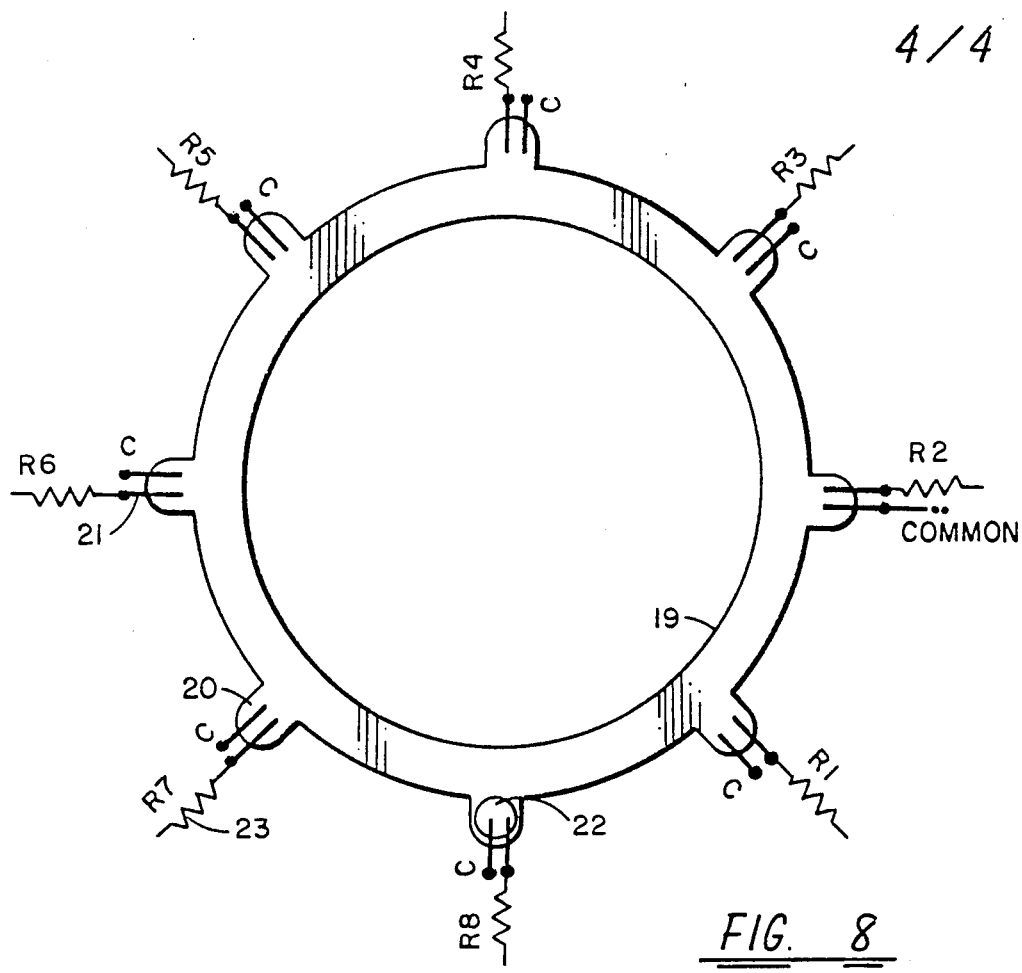
FIG. 8 is an electrical wiring schematic of the FIG. 7 device showing resistors in series with the electrodes to provide incremental analog control.

FIGS. 7 and 8 illustrate a crescent-shaped or fully circular-shaped bulb 19 having a plurality of reservoirs 20 spaced along the non-conductive bulb structure 19. Each of the reservoirs have two electrodes 21. Since a bead of conductive fluid such as mercury 22 is contained within bulb 19, each of the reservoirs acts as a switch; when the bead of mercury is captured by any one of the reservoirs, the electrodes 21 of that reservoir are shorted thus generating an electrical signal when the structure is wired into an electrical system. A partial electrical wiring diagram is shown in FIG. 8 wherein one electrode (C) of each pair is wired in common to a common tie point. Each of the remaining electrodes are usually independently wired to a cable connector (not shown). If a resistor 23 is used in series with any of the electrodes, incremental resistivity control results in an incremental analog circuit system, instead of a direct on/off digital control system. When the orientation of the bulb is changed, a new signal is generated for the system being controlled. This design of integrated multiple mercury switches would be enclosed in the basic rectangular control box previously discussed.

It should be noted that whenever any of the control devices already discussed are attached to a system being controlled, feedback signals are generated which describe the tilt attitude or spatial orientation of the system or object being observed. Annunciators can be activated by the feedback signals or the feedback signals can be interfaced to a computer system for further processing.

Figure 9:
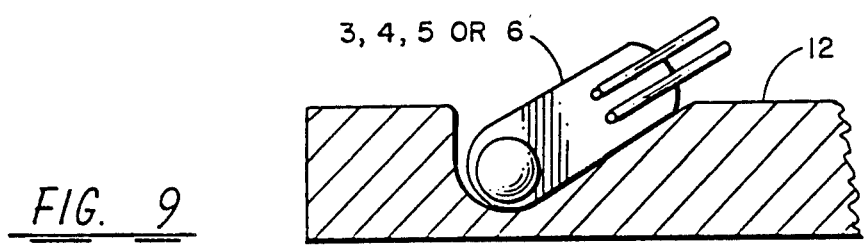
FIG. 9 is a cross-sectional view of a concave formed or molded support/holder for a mercury bulb switch; this can be an integral part of a printed circuit board.
Figure 10:
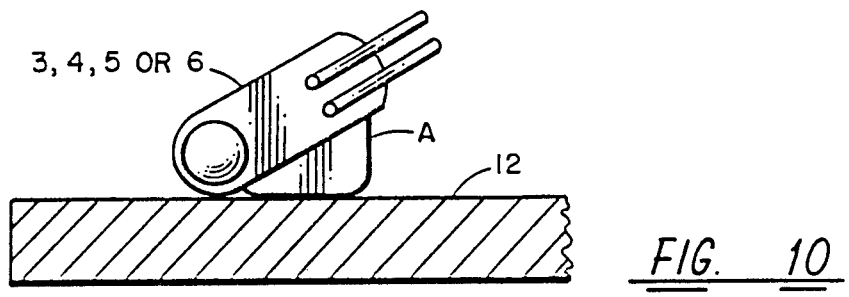
FIG. 10 is a side view of a special preformed bulb of a mercury switch that facilitates mounting at a desired angle to a supporting plane.

FIG. 9 shows a concave molded or formed section of base support 12 (or a printed circuit board), for holding one or more switches 3, 4, 5, or 6 in a desired position; it could be an integral part of the bottom base section 2 of the control box. Alternatively, as in FIG. 10, the bulb part of the conductive fluid (preferably mercury) gravity switch 3, 4, 5, or 6 could be shaped (with an appendage such as A) to facilitate mounting it at the appropriate angle and position to a base support 12 of the control box. It should be noted that the array of mercury switches used in various applications could be molded as one unit with each set of electrodes and ball of conductive fluid kept in separate compartments.

In other embodiments, it may be necessary to use interface circuitry for properly matching the system being controlled. This may be accomplished inside of the control box before wiring to the connector. Alternatively, the interface circuitry or adaptor connector for the system being controlled may be accomplished after connector 11 by using an adaptor cable that connects to connector 11. It should be noted that connector 11 can be affixed to the control box, thus obviating the need for cable 9; this would require adaptor cables with connectors to be provided as an accessory item to the control box. Another embodiment may use one or more auxiliary control switches and these switches may be located on any face of the control box.

While the foregoing material describes and illustrates preferred embodiments of the invention, there could be changes in structure, incorporation of other elements, and variations in operational application without departing from the basic spirit of the invention that is defined by the appended claims.

What is claimed for protection and security by Letters Patent is:

1. A manually held tilt sensitive control box device for producing electrical control signals, comprising:
    an enclosure for said control box device structured in a boxlike shape wherein main structural members of said enclosure are rigidly disposed relative to each other;
    means disposed within said enclosure for producing said electrical control signals corresponding to different tilt attitudes;
    said enclosure shaped for holding with both hands symmetrically disposed at opposing left and right sides of said enclosure to facilitate tilting said enclosure around an axis of said enclosure to produce said electrical tilt attitude control signals for control of an apparatus; and
    said enclosure having at least one planar horizontal top surface for auxiliary applications that include providing an operator of said control box device with a visual reference to facilitate attaining a neutral tilt attitude position with respect to a horizon.

2. Control box device of claim 1 having tilt attitude sensing means coupled to said enclosure for producing a directional control signal corresponding to said different tilt attitudes of said enclosure.

3. The control box device as recited in claims 1 or 2 wherein said signal producing means for producing said tilt attitude control signal includes a gravity type switch that closes and opens an electrical circuit in response to changes in its tilt attitude.

4. The control box device of claims 1 or 2 further comprising: at least a first and second electromechanical type switch disposed on said enclosure for actuation when manually depressed to produce an auxiliary control signal, said switches being spaced apart such that said first switch may be activated by the fingers of one hand while said second switch may be activated by the fingers of the other hand.

5. The control box device as recited in claim 4 wherein said enclosure has a top surface that accommodates a plurality of said electromechanical type switch disposed on said top surface for manual actuation to produce auxiliary control signals.

6. The control box device of claim 1 wherein said enclosure has a bottom surface that provides means for maintaining the tilt attitude of said control box at a neutral attitude when said enclosure is placed on any horizontal supporting structure.

7. The control box device of claim 1 having coupling means for electrically interfacing with said apparatus being controlled, said apparatus comprising equipment selected from a group consisting of computers, video game systems, toys, and machinery.

8. The boxlike enclosure of said control box device of claim 1 further including being shaped to represent the shape of said apparatus being controlled, including the shape of any object being controlled appearing on a video display.

9. A manually held tilt sensitive control box device for producing an electrical control signal corresponding to different tilt attitudes of said control box device with respect to the horizon, said device comprising:
    an enclosure having two opposing sides, a top section and a bottom section, the distance from said top section to said bottom section being selected such that when said enclosure is gripped by a hand on said sides the fingers and thumb extend from under said bottom section to said top section, respectively, said top section having a substantially flat surface such that when said enclosure is gripped with two hands on both said opposing sides of said enclosure a substantially straight line extends between said hands along said flat surface to provide a reference with respect to the horizon; and
    means disposed within said enclosure for producing said electrical control signals corresponding to different tilt attitudes of said line with respect to the horizon.

10. The control box device as recited in claim 9 wherein the signal producing means includes a gravity switch that closes and opens an electrical circuit in response to changes in its tilt attitude orientation.

11. The control box device as recited in claim 9 wherein said enclosure has a plurality of electromechanical switches disposed primarily on said top section that are positioned respective of said thumb and fingers of said hands whereby said switches produce auxiliary electrical control signals when manually actuated.

12. The control box device of claim 9 wherein said enclosure has a bottom surface that provides means for maintaining the tilt attitude of said control box at a neutral attitude when said enclosure is placed on any horizontal supporting structure.

13. The control box device of claim 9 having coupling means for electrically interfacing with said apparatus being controlled, said apparatus comprising equipment selected from a group consisting of computers, video game systems, toys, and machinery.

14. A method of producing electrical control signals for an apparatus being controlled to indicate changes in tilt attitude of a top surface of a control box device with respect to a horizon, said method comprising the steps of: holding with two hands spaced across from each other said control box device having a top section with a substantially flat top surface, a bottom section and two opposing side surfaces such that when said control box device is held with said two hands the hands extend from above said top section to below said bottom section; holding said control box device with said two hands in an orientation such that a plane of said top surface is parallel to the ground; forming a line parallel to the horizon between said hands when the plane of said top surface is parallel to said ground; changing the tilt attitude of said line with respect to the horizon; and providing said electrical control signals to said apparatus being controlled in response to changes in the tilt attitude of said line with respect to the horizon.

15. The method as recited in claim 14 further comprising steps of positioning a plurality of switches on said control box adjacent to the thumb and fingers of said hands whereby said switches when manually actuated produce auxiliary electrical control signals.

* * * * *